April 17, 1962 F. H. SMITH 3,030,105
WORK STOP
Filed Aug. 26, 1958
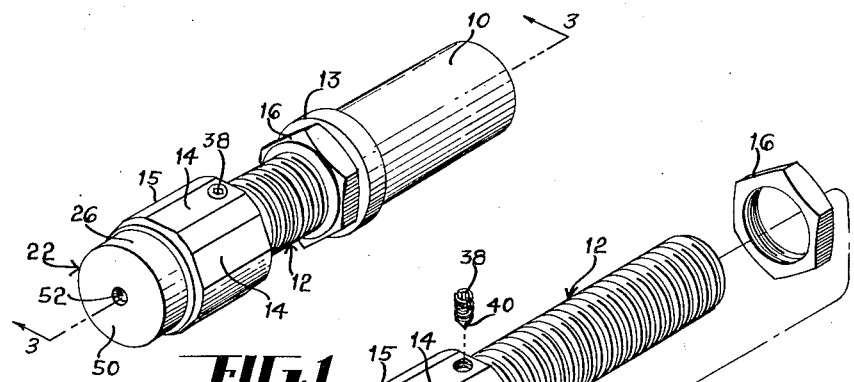
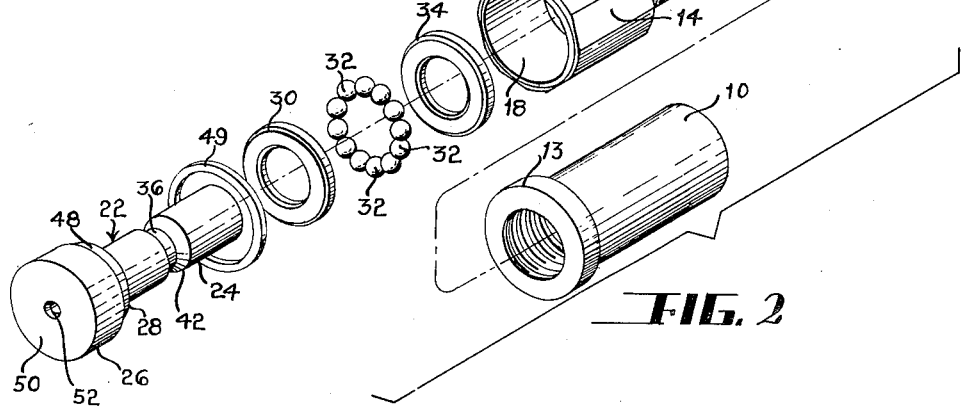
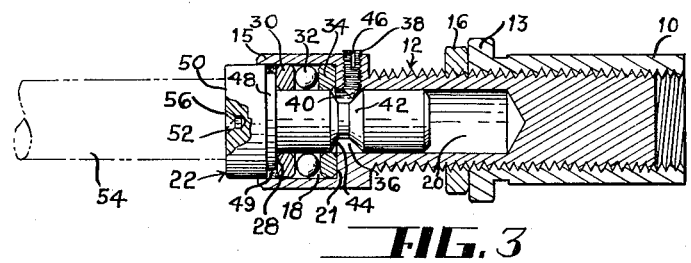
INVENTOR.
FREDERICK H. SMITH
BY
HIS ATTORNEYS

United States Patent Office 3,030,105
Patented Apr. 17, 1962

3,030,105
WORK STOP
Frederick H. Smith, 2611 Evermur Drive, Dayton, Ohio
Filed Aug. 26, 1958, Ser. No. 757,325
1 Claim. (Cl. 269—315)

This invention relates to a work stop and more particularly to a device for arresting the movement of stock into a machine tool or the like, and to improvements therein.

For convenience the work stop will be described in relation to a machine tool for machining parts from a bar or work piece which is inserted through and rotated with a hollow spindle. For fabrication of successive parts, the work piece is progressively moved through the spindle until it is stopped, each time at the proper location, by a work stop against which the work piece abuts. While the work stop is thus described in relation to a particular use, it is intended that this work stop may also be used as a means for stopping or controlling the axial location or movement of any moving part.

An object of the present invention is to provide a work stop for abutment with a rotating work piece wherein a portion of the work stop is free to rotate with the work piece. The work stop may be mounted in a tail stock or a turret.

Another object of this invention is the provision of a thrust bearing behind the rotatable portion of the work stop and means for retaining the rotatable portion in a cavity.

Another object of this invention is the provision of means for retaining the rotatable portion of the work stop in its cavity, which means may also be used to take up play in the thrust bearing.

A further object of this invention is the provision of means for adjusting the axial location of the work stop with respect to the machine in which it is used.

Other objects and advantages reside in the construction of parts, the combination thereof, the method of manufacture and the mode of operation, as will become more apparent from the following description.

In the drawing,

FIGURE 1 is a perspective view of the work stop.

FIGURE 2 is an exploded perspective view illustrating the assembly of the work stop.

FIGURE 3 is a sectional view with a portion broken away taken longitudinally through the axis of the work stop of FIGURE 1.

Referring to the drawing in greater detail, the work stop includes a bushing 10 shaped on the outside to fit into a complementary recess or socket in a machine tool, such as a tail stock or turret, not shown. This bushing is internally threaded to receive a threaded elongate shaft 12. In conventional use the bushing 10 when installed in the machine tool is aligned coaxially with the spindle of the machine tool and, accordingly, the shaft 12 is supported in coaxial relation to the spindle of the machine tool.

A shoulder 13 at the outer end of the bushing 10 locates the bushing axially with respect to the spindle of the machine tool. The arrangement is such that the threaded shaft 12 may be rotated with respect to the bushing 10, so as to adjust its axial position with respect to the spindle of the machine tool. To this end the shaft 12 is provided with an enlarged head 15 having flats 14 thereon for engagement with a suitable wrench. A hexagonal nut 16 threadedly engaging the shaft 12 may be tightened against the shoulder 13 of the bushing 10 to lock the position of the shaft 12 in the bushing 10.

As best seen in FIGURE 3, the shaft 12 is provided with a bored hole or cavity 18 extending axially into the enlarged head 15. A second, smaller bore hole or cavity 20 extends axially further into the shaft 12 from the base or shoulder 21 of the cavity 18. The smaller cavity 20 receives the shaft 24 of a rotatable spindle or stop element 22.

The spindle 22 is provided with an enlarged head 26 journalled in the larger cavity 18. This enlarged head 26 extends partly beyond the end of the shaft 12 and projects partly inside the cavity 18.

Where the shaft 24 and the enlarged head 26 meet, an annular shoulder 28 is formed. A thrust bearing is assembled between this annular shoulder and the base of the cavity 18. This thrust bearing comprises an annular ball bearing race 30, a plurality of balls 32 arranged in a ring around the shaft 24, and an annular ball bearing race 34 abutting the shoulder 21. The balls 32 are made as large as possible with respect to the available space between the inner wall of the cavity 18 and the outer wall of the shaft 24 to provide maximum radius at the point of contact between the balls 32 and the races 30 and 34. This minimizes Brinelling of the surfaces of these races.

Preferably, the diameter of the balls 32 slightly exceeds the radial thickness of the races 30 and 34 so that these balls may operate as a ball bearing ring between the inner wall of the cavity 18 and the shaft 24 whenever the spindle 22 is subjected to a radial thrust. In other words, the balls 32 may serve a dual function in that, depending upon the circumstances, they may establish rolling contact between the races 30 and 34 or between the inner wall of the cavity 18 and the outer periphery of the shaft 24.

A set screw 38 having a conical end 40 threadedly penetrates the head portion 15 of the shaft 12. This set screw 38 is so located that, upon penetration of the wall of the head portion 15, the conical end 40 enters the smaller cavity 20 in the interior of the shaft 12. As best seen in FIGURE 3, the shaft 24 of the spindle 22 is provided with an annular groove 36 for receiving the conical end 40 of the set screw 38.

The annular groove 36 has opposite walls 42 and 44. The wall 42, which is that wall most remote from the enlarged head 26 of the spindle, has a taper complementing the taper of the conical end 40 of the set screw. The construction is such that when the set screw 38 is advanced into the cavity 20, its conical end 40 will cam against the tapered wall 42 of the annular groove 36 and will thereby operate to draw the spindle 22 inwardly of the shaft 12 taking up any play that may exist in the thrust bearing.

As best illustrated in FIGURE 2, the set screw 38 is of a conventional type comprising an externally threaded metallic rod provided with a socket adapted to receive a complementary wrench, not shown. So that the set screw will be self-locking, the socket end is bisected with a transverse slot 46, the opposite halves thereby created being flared outwardly so that they will tightly grip the adjacent threaded wall of the enlarged head 15 of the shaft 12, thereby frictionally securing the position of the set screw. The set screw is hardened to obtain the desired springiness in the outwardly flared halves. In the preferred practice, the set screw 38 is advanced into engagement with the tapered wall 42 of the annular groove 36 until the thrust bearing is snug, then the set screw is rotated in reverse approximately one-half turn to introduce a predetermined looseness in the thrust bearing so that it will roll freely.

With particular reference to FIGURE 2, the work stop is assembled as follows: The shaft 12 is supported vertically with the cavities 18 and 20 thereof pointed upwardly. The ball race 34 is then positioned in the cavity 18 against the base 21 thereof. The ball race 30 is projected over the shaft 24 of the spindle 22 against the shoulder 28 thereof. Holding the ball race 30 in position on the spindle 22, the spindle is lowered into the cavity 18 until the shaft 24 thereof commences to enter the cavity 18. At this point there is a sufficient gap between the ball race 30 on the spindle 22 and the end of the enlarged head 15 on the shaft 12 that the ball elements 32 may be inserted in the cavity 20. With the balls 32 in place, the spindle 22 is lowered into its home position in the shaft 12 and thereafter the set screw 38 is rotated into position to engage the annular groove 36.

In this method of assembly there is the possibility that one or more of the balls 32 will roll into the annular groove 36 as the spindle 22 is moved into home position. Should this happen, the tapered wall 44 at the margin of the annular groove 36 will function to cam the balls 32 out of the groove 36 back into position between the races 30 and 34.

As best seen in FIGURE 3, the shoulder 28 of the spindle 22 is provided with an annular relief or offset 48. This offset provides a pocket for receipt of an annular packing 49 providing a dust seal between the atmosphere and the adjacent thrust bearing.

The extreme outer end of the spindle 22 is provided with a surface 50 normal to the axis of rotation of the spindle 22. A conical recess 52 coincident with the axis of rotation of the spindle 22 is provided in the surface 50 to accommodate any boss or projection which may remain on the work piece which is to be located. Thus, in FIGURE 3, there is shown a work piece 54 having a conical boss 56 projecting into the recess 52. The operation of the work stop is such that the work piece 54 may be accurately positioned in the machine tool upon engagement with the end 50 of the spindle 22 and while so positioned may be freely rotated for subsequent machining operations.

Since the work stop in operation will be subjected to repeated impacts from the axially moving work piece, it is preferably constructed of hardened steel throughout.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

A work stop for accurately arresting the axial movement of a rotating work piece comprising, in combination, an elongated shaft having an axially extending cylindrical first cavity in one end thereof, and a cylindrical second cavity of smaller diameter than said first cavity extending axially inwardly from the base of the first cavity, the base of the first cavity forming a shoulder, roller bearing means abutting said shoulder, a spindle journalled for rotation in said second cavity, said spindle having an enlarged head portion at its outer end projecting partly in said first cavity and partly out of said first cavity beyond the end of said shaft, the outer end of said enlarged head providing a work locating surface, the inner end of said enlarged head forming an annular shoulder seated against said roller bearing means, said spindle having an annular groove therein opening through said second cavity, the wall of said groove most remote from the enlarged head of said spindle tapering outwardly, said shaft having an internally threaded aperture in the wall thereof a set screw threadedly engaging said threads, said set screw projecting into the annular groove of said spindle and having a conical end portion engaging the outwardly tapered wall of said annular groove, the construction and arrangement being such that movement of said conical end portion into said annular groove against the tapered wall thereof will operate to draw said spindle inwardly of said shaft causing the enlarged head portion to be tightened against said roller bearing means to thereby minimize axial movement of said spindle, said spindle being free to rotate with the work piece, said set screw being provided with a transverse slot bisecting same into halves, said halves being flared outwardly such that upon said set screw entering the threaded aperture in the wall of said shaft said halves press outwardly to frictionally secure the set screw in position to hold the set screw from being rotated by the frictional contact with the tapered wall.

References Cited in the file of this patent

UNITED STATES PATENTS

| | | |
|---|---|---|
| 1,292,707 | Clark | Jan. 28, 1919 |
| 1,596,708 | Bellows | Aug. 17, 1926 |
| 1,940,878 | Olson | Dec. 26, 1933 |
| 2,167,014 | Verderber | July 25, 1939 |
| 2,349,159 | Freeman | May 16, 1944 |
| 2,437,740 | Haynes | Mar. 16, 1948 |
| 2,748,641 | Caiello | June 5, 1956 |